A. KINGSBURY.
THRUST BEARING.
APPLICATION FILED JAN. 26, 1911.

1,117,499.

Patented Nov. 17, 1914.
3 SHEETS—SHEET 1.

WITNESSES:
Fred H. Miller
D. W. Mace

INVENTOR
Albert Kingsbury
BY
R. J. Dearborn
ATTORNEY

A. KINGSBURY.
THRUST BEARING.
APPLICATION FILED JAN. 26, 1911.
1,117,499.
Patented Nov. 17, 1914.
3 SHEETS—SHEET 2.
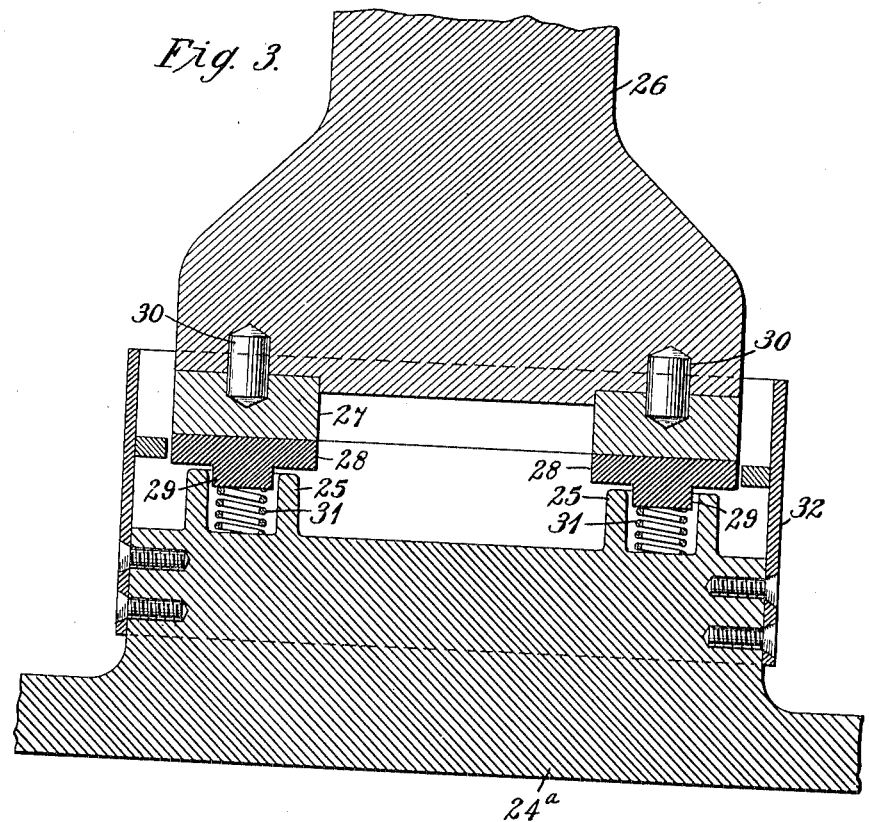
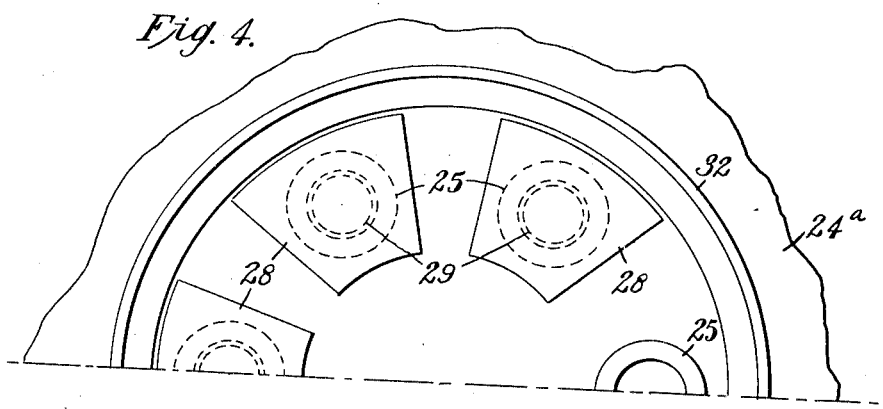

A. KINGSBURY.
THRUST BEARING.
APPLICATION FILED JAN. 26, 1911.
1,117,499.
Patented Nov. 17, 1914.
3 SHEETS—SHEET 3.
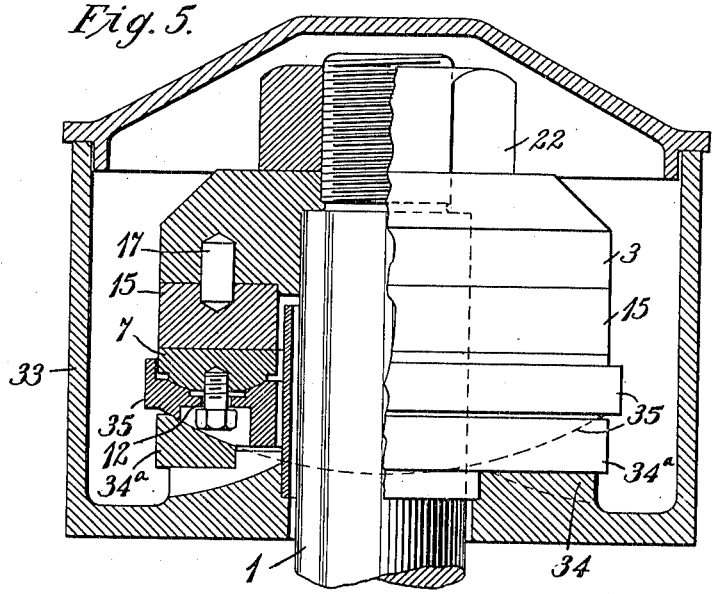
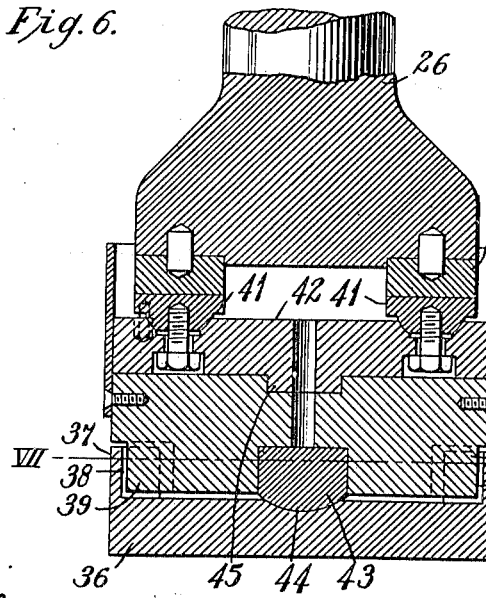
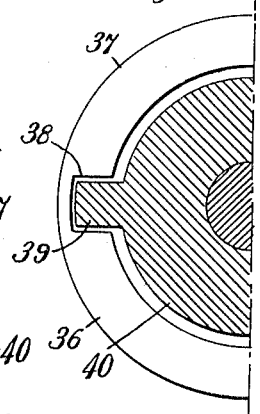
WITNESSES:
Fred H Miller
D. H. Mace
INVENTOR
Albert Kingsbury
BY R. J. Barbour
ATTORNEY

UNITED STATES PATENT OFFICE.

ALBERT KINGSBURY, OF PITTSBURGH, PENNSYLVANIA.

THRUST-BEARING.

1,117,499.  Specification of Letters Patent.  Patented Nov. 17, 1914.

Application filed January 26, 1911. Serial No. 604,715.

*To all whom it may concern:*

Be it known that I, ALBERT KINGSBURY, a citizen of the United States, and a resident of Pittsburgh, in the county of Allegheny and State of Pennsylvania, have invented a new and useful Improvement in Thrust-Bearings, of which the following is a specification.

In Patent No. 947,242, granted January 25th, 1910, on an application filed by me on May 20, 1907, I have shown and described a thrust bearing which operates successfully at relatively high speeds and under very high pressures and comprises a plurality of radial shoes which are arranged to automatically maintain a film of lubricating fluid between the coöperating bearing surfaces.

One object of my invention is to provide a bearing of this character that shall be simple and durable in construction and that shall embody means for equalizing the pressure upon the radial shoes of which the bearing is comprised.

Other objects will be set forth hereinafter.

In order that equal pressures may be exerted on the radial shoes which form parts of the bearing, the bearing must either be made with great accuracy or some special means provided for accomplishing this purpose. In fact, it is evident that even if the bearing is so constructed that the pressures on the several shoes are equal when new, they may wear unequally in service and consequently it is desirable to provide automatic means for maintaining the equality.

According to my present invention I obtain the objective results above referred to, in a simple and efficient manner without in any way interfering with the individual mounting of each shoe.

Figure 1:
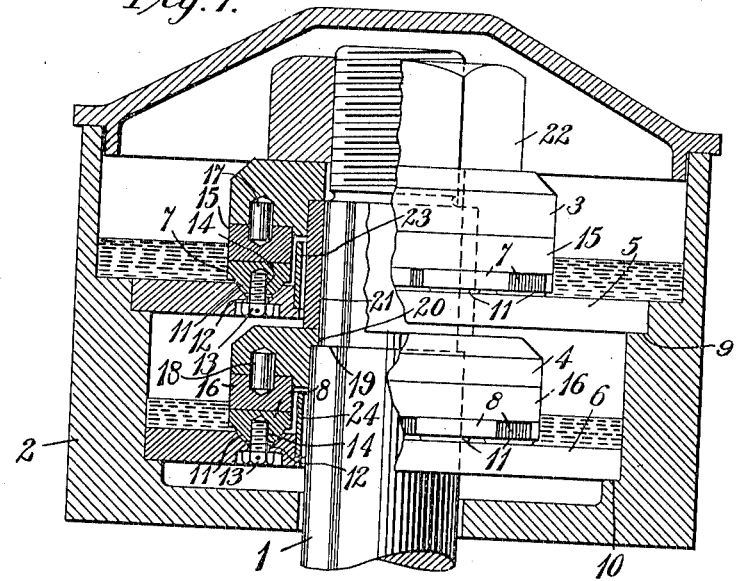
Figure 2:
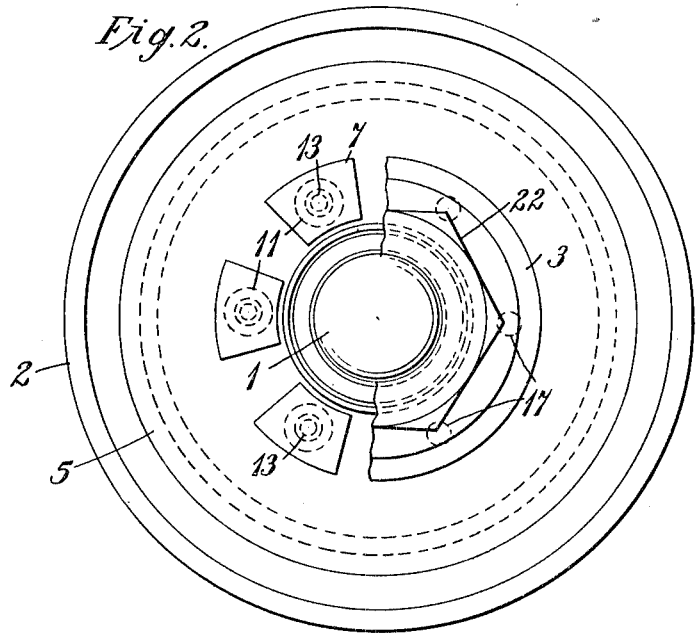

Figure 1 of the accompanying drawings is a partially sectional elevation, and Fig. 2 is a plan view, with certain of the parts broken away to disclose the radial shoes, of a thrust bearing constructed in accordance with my invention. Fig. 3 is a sectional elevation, and Fig. 4 is a partial plan view of a modified bearing structure embodying my invention. Fig. 5 is a view corresponding to Fig. 1, and Fig. 6 is a view corresponding to Fig. 3 of still other structural modifications of my invention. Fig. 7 is a sectional view on the line VII—VII of Fig. 6.

Like characters of reference designate corresponding parts in all the figures.

Referring to Figs. 1 and 2 of the drawings, the structure here shown comprises a vertical shaft 1, a hollow stationary bearing support 2 into which the upper end of the shaft extends, and collars or flanges 5 and 6 on which a plurality of radial bearing shoes 7 and 8 are pivotally supported. The interior of the supporting member 2 increases in diameter from the bottom to the top by a series of steps which form supporting ledges 9 and 10 for the flat rings 5 and 6.

The rings are preferably formed of spring steel or some other strong resilient material and are only supported at their outer edges in order that they may constitute resilient supports for the radial shoes which they carry. The shoes 7 and 8 are similar to each other and each of them is provided with a spherically curved projection 11 which extends downwardly from approximately the middle point of its bottom surface.

The rings 5 and 6 are provided near their inner edges with a series of uniformly distributed transverse holes 12. Each of these holes is counter-bored from the top surface of the ring to form a spherically curved seat for the projection 11 of one of the radial shoes and is cylindrically counter-bored from the bottom surface of the ring to receive the head of a bolt 13 which extends loosely through the hole 12 and is screw-threaded into a suitably tapped hole 14 in the shoe.

The tapped hole is concentric with the projection 11 and the diameter of the hole 12 is considerably larger than the diameter of the bolt 13, so that the shoe is permitted to rock or tilt on the spherically curved seat as a fulcrum.

The bolts 13 are tightened only while machining the flat surfaces of the shoes. They are afterward loosened and then locked by any suitable means (not shown) to prevent accidental adjustment.

The holes 12 and the bolts 13 may be omitted entirely and spherically curved seats in the rings 5 and 6 relied upon to hold the shoes in position.

The number of shoes in each group and the relative location of the groups is, of course, immaterial to my invention.

The shoes 7 and 8 are respectively engaged by bearing rings 15 and 16 which surround the shaft 1 and are held in position against the flanges or collars 3 and 4 by means of dowel pins 17 and 18.

In order to make the bearing easy to assemble, the shaft 1 is reduced in diameter at its upper end to form a shoulder 19, and the flange or collar 4 is provided with an annular projection 20 to engage this shoulder. After the collar 4 is in position, a sleeve 21 is fitted upon the shaft and holds the collar in position. The end of the sleeve constitutes a shoulder on which the collar 3 is supported, all of the parts mounted on the shaft being held in position by a nut 22 which is screwed onto the end of the shaft.

The inner edges of the flat rings 5 and 6 are provided with flanges 23 and 24 which coöperate with the walls of the stationary supporting member 2 and the flat rings to constitute oil pockets in order to enable the bearing surfaces to be submerged in lubricating fluid as indicated in Fig. 1 of the drawings. When a load is applied to the shaft and the bearing is in operation, the flat rings 5 and 6 are sufficiently resilient to yield slightly and to equalize the pressures on the shoes.

While the thrust bearing shown in Fig. 1 is adapted for a vertical shaft, the load being suspended from above, the structure may obviously be adapted for receiving the end thrust in a horizontal shaft.

Since either of the coöperating bearing members may be stationary and either rotatable, I have herein referred to them broadly as "relatively rotatable members".

Referring to Figs. 3 and 4, the structure here shown comprises a stationary supporting base 24$^a$ having a plurality of hollow cylindrical projections 25, a shaft 26, which is enlarged at its lower end and is provided with a bearing ring 27 and a plurality of radial bearing shoes 28 having downwardly extending cylindrical projections 29 which fit loosely into the openings of the projections 25. The bearing ring 27 is held in position on the lower end of the shaft 26 by dowel pins 30, and the upper edges of the projections 25 are rounded to permit rocking movements of the shoes 28. These shoes are severally mounted on helical springs 31 which are disposed in the hollow projection 25 between the lower ends of the projections 29 and the upper surface of the base 24$^a$. The base is provided with a flange 32 which forms an oil well and permits the bearing surfaces to be submerged.

Referring to Fig. 5 of the drawings, the structure here shown is somewhat similar to that shown in Fig. 1, and corresponding parts are indicated by the same reference characters as those used in Fig. 1. A single flange 3 is secured to the end of the shaft 1 by means of a nut 22, and is provided with a bearing ring 15 which is held in position by dowel pins 17. A stationary supporting member 33 corresponding to the member 2 of Fig. 1 is provided with an annular projection 34 which extends inwardly from its bottom surface and is crowned with ring 34$^a$ having a concave spherically curved surface, to constitute a seat for a ring 35 having a corresponding convex bottom surface.

The ring 35 is provided with a series of holes 12 which are counter-bored, as in Fig. 1, to constitute seats for radial shoes 7. The radial shoes engage the bearing ring 15 and are independently fulcrumed on the ring 35. The ring 35 as a whole is capable of a tilting movement on the projection 34 and, consequently, the parts will automatically assume such a position that the load is equally distributed on the shoes.

Referring to Figs. 6 and 7, the structure here shown corresponds, in general, to that of Fig. 3, the shaft 26 being provided with a bearing ring 27 at its lower end. A stationary base 36, which corresponds to the base 24$^a$ of Fig. 3, is provided with a flange 37 having notches 38 that are adapted to receive lugs 39 which extend outwardly from a member 40 on which bearing shoes 41 are mounted. The member 40 is composed of three parts, viz: A ring 42, on which the shoes 41 are pivotally supported as in Figs. 1 and 5, a bearing member 43 having a spherically curved convex bottom surface which is adapted to engage a correspondingly curved concave seat 44 in the stationary member 36, and an intermediate body member.

The member 40 is prevented from rotating by the lugs 39, and the member 42 is prevented from rotating relative to the body member by its shape or otherwise. As shown in the drawing, the member has a square lug 45 projecting into a square hole in the member 40. The member 40 is, however, free to rock on the spherical seat 44 and, consequently, the load on the shoes 41 is equalized.

I desire that the scope of my invention shall only be limited by the appended claims.

I claim as my invention:

1. A thrust bearing comprising relatively rotatable members, a plurality of radial shoes between the members and pivotally attached to one of them, one of said members embodying resilient and automatically operating means for equally distributing the load on the shoes.

2. A thrust bearing comprising a relatively stationary member, a plurality of independently pivoted radial shoes which are associated therewith, a relatively rotatable member arranged to make bearing contact with the shoes and interposed resilient means between the relatively stationary member and the shoes for equalizing the bearing pressure exerted upon said shoes.

3. A thrust bearing comprising a relatively stationary member, a plurality of groups of independently pivoted radial shoes resiliently supported by said member in substantially parallel planes, and a relatively rotatable member arranged to make bearing contact with said groups of shoes.

4. A thrust bearing comprising a relatively stationary member, a plurality of groups of independently pivoted radial shoes resiliently supported thereon in substantially parallel planes, a relatively rotatable member arranged to make bearing contact with said groups of shoes and means independent of the shoes for permitting the bearing surfaces of the respective groups of shoes to be immersed in liquid lubricating baths.

5. A thrust bearing comprising a relatively stationary member, a flat ring supported thereon near its outer edge, a plurality of radial shoes, having plane outer surfaces, loosely mounted near the inner edge of the flat ring and a relatively rotatable member adapted to make bearing contact with the plane outer surfaces of the shoes.

6. The combination with a rotatable shaft, subjected to end thrust, and collars provided with corresponding annular bearing surfaces substantially perpendicular to the center line of the shaft, of relatively stationary yielding members opposed to the annular bearing surfaces of the collars and a plurality of bearing shoes each tiltingly supported on the yielding members and adapted to make bearing contact with the opposed bearing surfaces.

7. In combination with a rotatable shaft subjected to end thrusts, and collars for the shaft having annular bearing surfaces, of relatively stationary yielding members and interposed bearing shoes loosely supported at their middle points on the yielding members and making bearing contact with the bearing surfaces of the collars.

8. In a thrust bearing, the combination with a rotatable shaft and collars or flanges removably secured thereto and having corresponding annular bearing surfaces, of a relatively stationary member, yielding or resilient annular members supported thereon about the shaft and a plurality of groups of radial shoes pivotally secured to the yielding or resilient annular members and making bearing contact with the bearing surfaces.

9. The combination with a vertical shaft having a flange or collar near its upper end, and a bearing ring secured to the bottom radial surface of the flange or collar, of a hollow stationary member into which the upper end of the shaft extends, a yielding disk or flat ring supported near its outer edge by the hollow stationary member and a series of radial shoes mounted on the yielding disk or flat ring and adapted to make bearing contact with the bearing ring.

10. The combination with a vertical shaft having flanges or collars removably secured to its upper end, of a hollow stationary member concentrically bored to varying diameters to form annular ledges, flat resilient rings supported near their outer edges on the ledges of the stationary member and groups of radial bearing shoes severally supported on the resilient rings, the shoes of each group being equally distributed on a supporting ring, tiltingly secured thereto and adapted to make bearing contact with a flange or collar of the shaft.

In testimony whereof, I have hereunto subscribed my name this 23rd day of Jan. 1911.

ALBERT KINGSBURY.

Witnesses:
R. J. Dearborn,
B. B. Hines.